United States Patent [19]

Adachi

[11] Patent Number: 5,319,505
[45] Date of Patent: Jun. 7, 1994

[54] TOC RECORDING/REPRODUCING DEVICE

[75] Inventor: Tatsuya Adachi, Neyagawa, Japan

[73] Assignee: Matsushita Electric Industrial Co., Ltd., Osaka, Japan

[21] Appl. No.: 866,493

[22] Filed: Apr. 10, 1992

[30] Foreign Application Priority Data

Apr. 23, 1991 [JP] Japan .................................. 3-092004

[51] Int. Cl.⁵ ............................................ G11B 15/18
[52] U.S. Cl. ................................................. 360/72.2
[58] Field of Search ............................ 360/72.1, 72.2

[56] References Cited

U.S. PATENT DOCUMENTS

| | | | |
|---|---|---|---|
| 4,473,854 | 9/1984 | Oishi et al. | 360/72.2 |
| 4,630,143 | 12/1986 | Juso et al. | 360/72.2 |
| 4,870,515 | 9/1989 | Stokes | 360/72.2 |
| 5,121,269 | 6/1992 | Tsuchida et al. | 360/72.2 |
| 5,179,479 | 1/1993 | Ahn | 360/72.2 X |

FOREIGN PATENT DOCUMENTS 258786 12/1985 Japan.

OTHER PUBLICATIONS

"Digital Audio Taperecorder System", Published by The DAT conference, pp. 31-37, Jun. 1987.
"JAS Journal", published by Nippon Audio Association, pp. 26-27, Nov. 1987.
"Digital Audio Taperecorder System", Published by DAT conference, pp. 72-77, Jun. 1987.

Primary Examiner—Michael Koczo
Attorney, Agent, or Firm—Stevens, Davis, Miller & Mosher

[57] ABSTRACT

A TOC recording/reproducing device which can shorten the time required to read TOC by searching a closer TOC between two identical TOCs recorded at both starting terminals on first and second recording surfaces of the tape on the basis of tape position information detected from tape reproduction.

8 Claims, 10 Drawing Sheets

FIG. 4

| BIT NUMBER / BYTE NUMBER | 7 | 6 | 5 | 4 | 3 | 2 | 1 | 0 |
|---|---|---|---|---|---|---|---|---|
| 0 | S | CURRENT HOUR DATA | | | CURRENT FRAME NUMBER DATA | | | |
| 1 | CURRENT MINUTE DATA | | | | | | | |
| 2 | CURRENT SECOND DATA | | | | | | | |
| 3 | PROGRAM NUMBER DATA 1 | | | | | | | |
| 4 | S | HOUR DATA 1 | | | FRAME NUMBER DATA 1 | | | |
| 5 | MINUTE DATA 1 | | | | | | | |
| 6 | SECOND DATA 1 | | | | | | | |
| 7 | PROGRAM NUMBER DATA 2 | | | | | | | |
| 8 | S | HOUR DATA 2 | | | FRAME NUMBER DATA 2 | | | |
| 9 | MINUTE DATA 2 | | | | | | | |
| 10 | SECOND DATA 2 | | | | | | | |
| 11 | RMK | | | | | | | |

TOC RECORDING/REPRODUCING DEVICE

BACKGROUND OF THE INVENTION

1. Field of the Invention

The present invention relates to a TOC recording/reproducing device provided with a recording medium operable in two different directions, such as S—DAT (Stationary-head Digital Audio Tape Recorder).

2. Description of the Related Art

In recent years, digital technology has been applied to a large number of technical fields such as acoustics and image processing, and techniques relative to players, R—DATS (Rotary-head Digital Audio Tape Recorder), digital VTRS, etc. have been developed. Among them, the technique of pursuing comfort for use, such as high speed search, as well as the basic technique of recording/reproducing PCM signals have become important.

Among the high speed search techniques, attention has been paid to the method named 'TOC' (Table of Contents) in which the beginning of a desired musical piece is searched and reproduced using a table of base (head) addresses of musical pieces.

The conventional search method using TOC is disclosed in e.g. "JAS Journal" published by Nippon Audio Association, Nov., 1987, pp. 26-27.

An explanation will be given of the conventional high speed search method.

FIG. 10 shows a record of the tape for realizing the conventional high speed search. A TOC recording area named 'U—TOC', where a user can record, is located at the starting end of the tape. The U—TOC area is succeeded by audio data which is divided into units called programs. Usually, one musical piece corresponds to one program. Each program is numbered by a corresponding 'program number'. The absolute times indicative of the absolute addresses on the tape are recorded on the tape.

The format of the absolute time and TOC in DAT system is described in "DIGITAL AUDIO TAPERECORDER SYSTEM" published by DAT Conference, Jun. 1987, pp. 72-77.

An explanation will be given of the method of searching a program number using TOC.

When a cassette is inserted into a reproducing device, the U—TOC area at the tape starting terminal is searched to read TOC to be stored. Thereafter, if a direction of searching a program number is issued, the absolute time indicative of the head of the directed program is read from the stored TOC, thereby searching the position on the tape on which the absolute time has been recorded. Since the absolute times have been continuously recorded on the tape, if a user carries out the high speed search while reading the absolute time to compute the difference between the current position and a target position and earlier decelerate the speed, he can realize the optimum speed control. Thus, the time taken for the program search can be shortened. However, the conventional TOC recording/reproducing device, in which the TOC data is recorded only at the starting terminal of a tape, takes a relatively long time to initially read first.

SUMMARY OF THE INVENTION

The present invention intends to solve the above disadvantage of the conventional high speed search method.

An object of the present invention is to provide a TOC recording/reproducing device which can reduced the time required to read TOC by searching a nearer TOC, in TOC searching, between two TOCs recorded at both starting terminals on two recording surfaces of a tape.

In order to attain the above object, the TOC recording/reproducing device according to the present invention comprises starting terminal searching means for searching the starting terminal on a first surface of a tape having two recording surfaces, first TOC recording means for recording a first TOC at the starting terminal on the first surface, record starting point searching means for searching the starting terminal or record starting point on the second surface, and second TOC recording means for recording a second TOC having the same content as that of the first TOC at the starting terminal or record starting point on the second surface of the tape.

Further, the TOC reproducing device according to the present invention comprises tape position detecting means for detecting a position on a tape to output tape position information, tape length detecting means for detecting a tape length to output tape length information, TOC searching means for searching, on the basis of the tape position information and the tape length information, either of the TOCs at the starting terminal on the first surface, and the starting terminal or record starting point on the second surface, and TOC reproducing means for reproducing the searched TOC.

The above arrant of the present invention can shorten the time required for TOC searching in program number searching by detecting a current position on a tape to search a closer TOC between the same TOCs recorded at the starting terminal on the first side of the tape and the starting terminal or record starting point on the second side thereof. Also in updating the TOC data, the above arrangement can shorten the time taken for TOC searching during rewrite by first rewriting the closer TOC.

The above and other object and features of the present invention will be more apparent from the following description taken with the accompanying drawings.

BRIEF DESCRIPTION OF THE DRAWINGS

FIG. 4 is a format view of a recording format of the auxiliary data;

DESCRIPTION OF THE PREFERRED EMBODIMENT

Figure 1:
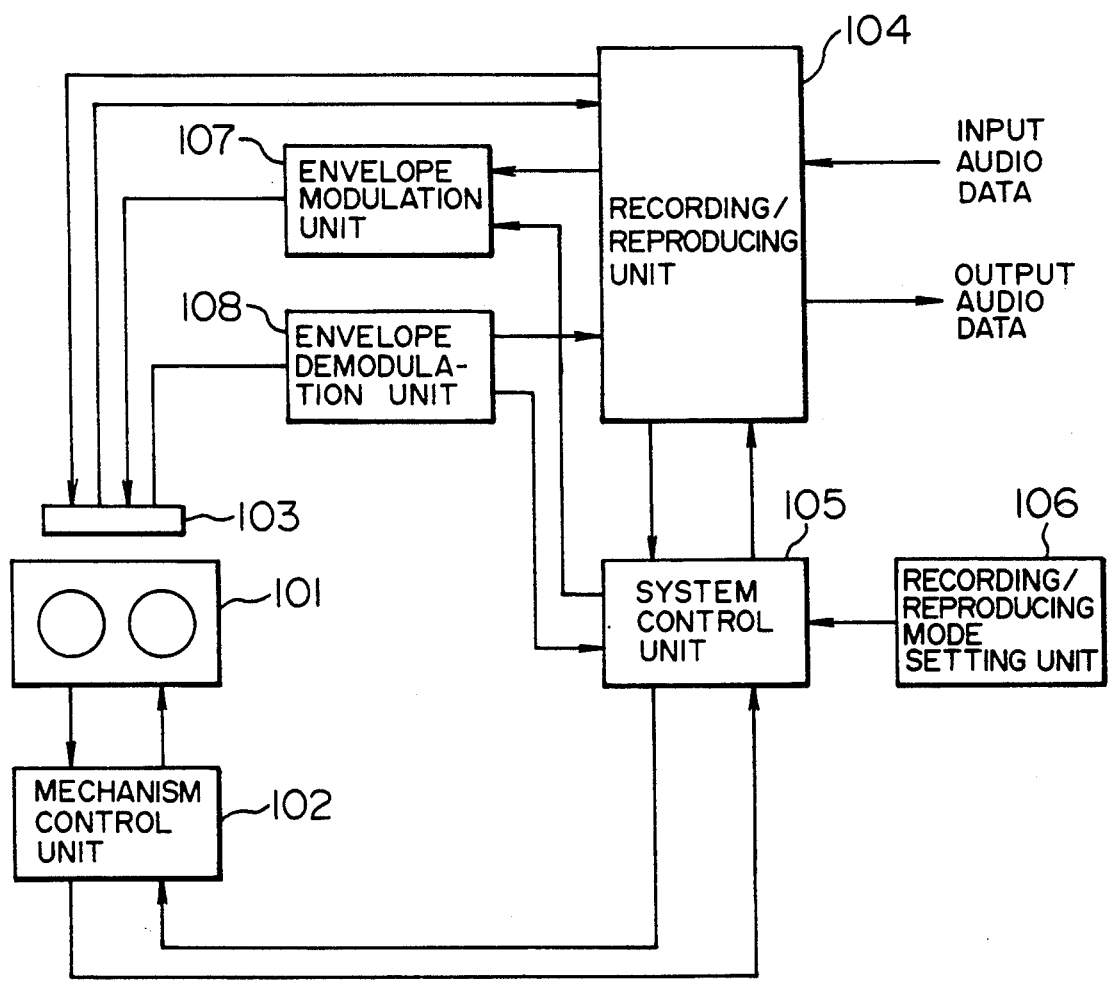
FIG. 1 is a block diagram of an arrangement of the TOC recording/reproducing device according to an embodiment of the present invention.

Now referring to the drawings, an explanation will be given of one embodiment of the present invention.

FIG. 1 is a block diagram of the recording/reproducing device including a TOC recording/reproducing device according to one embodiment of the present invention.

In FIG. 1, numeral 101 denotes a cassette for housing a magnetic tape, and numeral 102 denotes a mechanism control unit for controlling the running of the magnetic tape in accordance with an instruction from a system control unit 105. The mechanism control unit 102 checks the rotation of a reel and sends a tape end terminal flag to the system control unit 105 when the tape reaches its end terminal. The mechanism control unit 102 detects opening or closing of two identification holes of the cassette to send tape length information to the system control unit 105.

Table 1 shows a relationship between the state the two identification (ID) holes and tape length.

TABLE 1

| ID hole 1 | Id hole 2 | tape length |
|---|---|---|
| closed | closed | 45 minutes |
| closed | open | 60 minutes |
| open | closed | 90 minutes |
| open | open | 120 minutes |

Further, the mechanism control unit 102 detects the rotation of the reel to detect whether the tape has reached its starting terminal or its end terminal, thereby sending tape terminal information to the system control unit 105.

Numeral 103 denotes a recording/reproducing unit for recording on or reproducing from the magnetic tape. The recording head is composed of 9 (nine) heads; one of them serves to record auxiliary data, such as control data for reproduction control, whereas the remaining 8 (eight) heads serve to record main data such as audio data. The reproducing head is also composed of 9 (nine) heads; one of them serves to produce an auxiliary channel reproduction signal including the control data for reproduction control whereas the remaining 8 (eight) heads serve to produce a main channel reproduction signal including the audio data. The magnetic tape is divided into an upper area and a lower area; one is used for forward recording, whereas the other is used for reverse recording. The area, which is used for forward recording, is called "side A" whereas the other is called "side B". In order to change the running direction of the tape, the head 103 is rotated by 180°.

Figure 2:
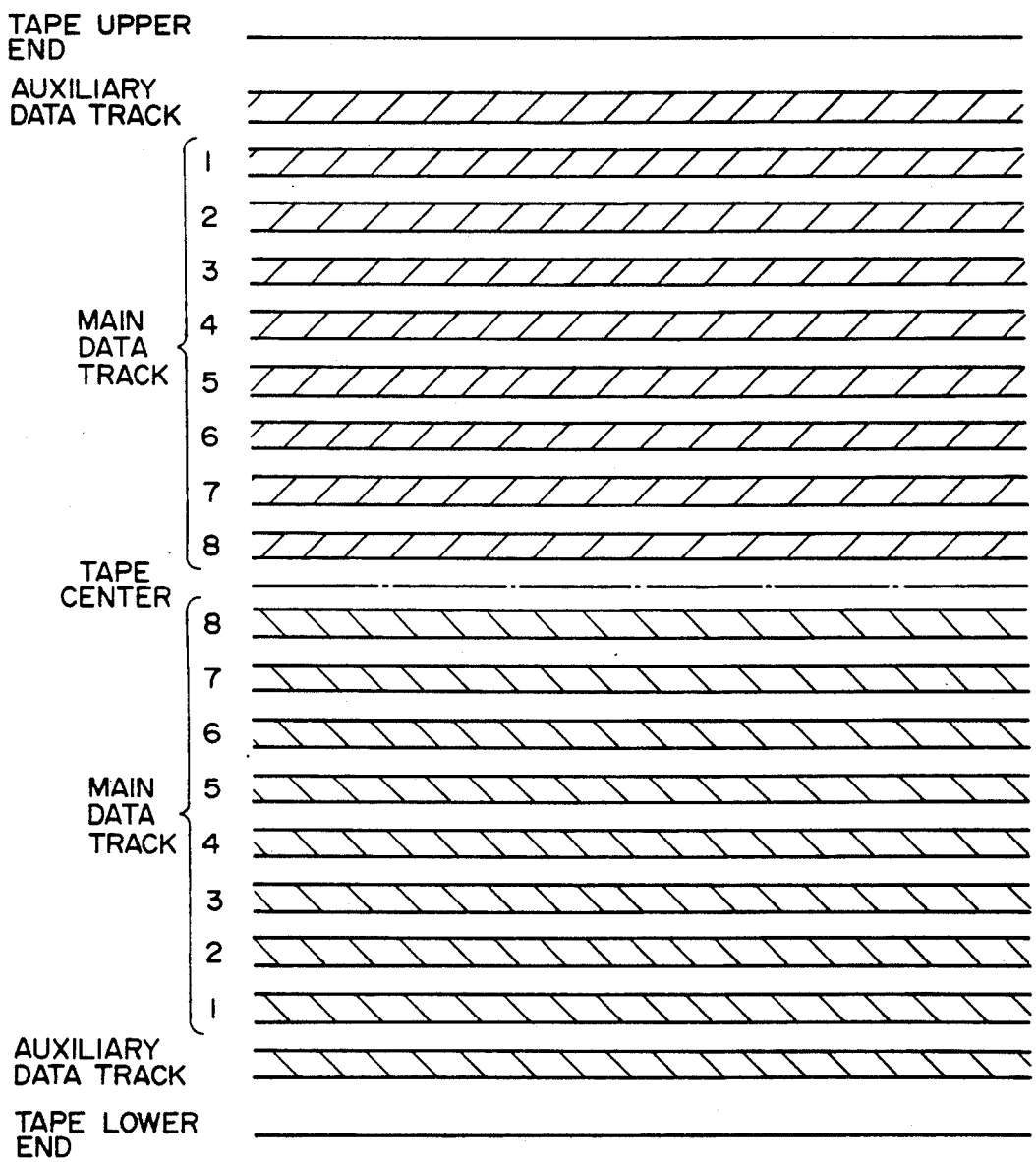
FIG. 2 is a pattern view of he a recording track pattern recorded on a tape by a recording head in the embodiment of FIG. 1.

FIG. 2 shows a recording track pattern on the tape recorded on the recording head.

Again referring to FIG. 1, a recording/reproducing unit 104 adds an error correction code to input audio data and 8-10 modulates it to supply the resultant signal to the eight recording heads for main-channel recording as a main channel record signal. (8-10 modulation is the modulation of 256 patterns of 8 bit data into 1024 pattern, 10-bit data adaptive for digital recording; see "Digital Audio Tape-Recorder System" published by DAT conference, Jun. 1987, pp. 31-37.) The recording/producing 104 adds an error correction code to the auxiliary data used for running control supplied from the system control unit 105 and modulates it to supply the resultant signal to an envelope modulating unit 107 a auxiliary channel record data. The recording/reproducing unit 104 demodulates the reproduction signal reproduced from the eight heads for main-channel reproduction in the recording/reproducing head 103, error-corrects the demodulated signal and produce the resultant signal as an output audio data. The recording/reproducing unit 104 demodulates the auxiliary channel reproduction data reproduced from the one head for auxiliary-channel reproduction in the recording/reproducing head 103, error-corrects the demodulated signal and produce the resultant signal as auxiliary data. The recording/reproducing unit 104 also supplies these data to the system control unit 105. The auxiliary data recorded by the recording/reproducing unit 104 includes a TOC which is a table of absolute times representative of absolute positions on the tape and absolute times of the beginnings of programs.

Incidentally, the record signal produced by the recording/reproducing unit 104 is sectioned into 200 MSEC frame units; the minimum recording unit is one frame.

The system control unit 105 instructs the running mode of the mechanism control unit 102 and the recording mode and the reproducing mode of the recording/reproducing unit 104. The system control unit 105 sends out data used for search control such as absolute times and TOC to provide the search mark information such as a start ID flag, a read-out area ID flag, etc. to the envelope modulation unit 107. The system control unit 105 receives the run-length information of the auxiliary data demodulated from the envelope demodulation unit 108 to detect the search mark information. It should be noted that the system control unit 105 can be realized by a microprocessor. Numeral 106 denotes a recording/reproducing mode setting unit through which a user provides commands to the system control unit 105. Namely, using the recording/reproducing mode setting unit 106, the user provides the system control unit 105 operation mode instructions, such as recording, reproducing or searching.

In this embodiment, the input/output data for the recording/reproducing device is audio data, but it may be other data such as video data; this data is generally called main data, in contrast to the auxiliary data used for control. The envelope modulation unit 107 modulates the auxiliary channel record data outputted from the recording/reproducing unit 104 on the basis of the search mark information such as the starting ID flag, the read-out ID flag, etc. and supplies the modulated data to the one recording head designated for auxiliary-channel recording in the recording/reproducing head 103.

An explanation will be given of the operation of recording TOC by the recording/reproducing device according to this embodiment thus constructed.

Figure 3:
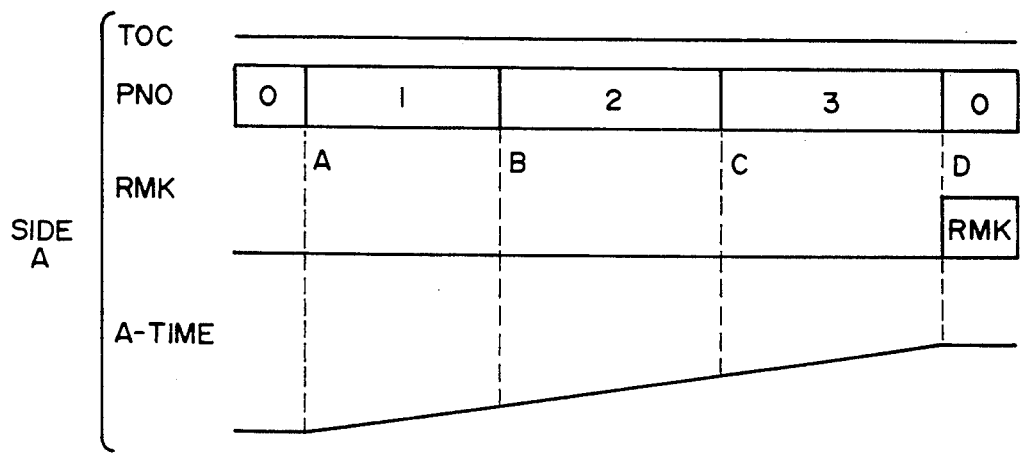
FIG. 3 is a schematic view of an exemplary record of auxiliary data on the tape in the embodiment of FIG. 1.
Figure 3:
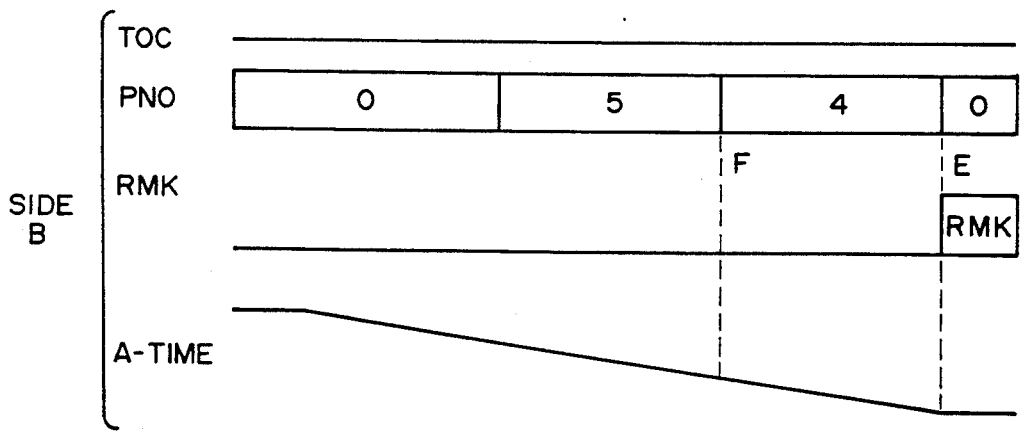

FIG. 3 shows a record of auxiliary data on a tape.

As seen from FIG. 3, side A has three program numbers 1 to 3 recorded thereon, whereas side B has two program numbers 4 to 5 recorded thereon. An absolute time A - TIME is recorded continuously from the starting point of program 1 on side A to the ending point of program 5 on side B. The absolute time at the ending point D of program 3 on side A has the same value as that at the starting point E of program 4 on side B.

Recorded at the record ending point of side A is a reverse marker RMK which indicates that the record starting point on side B is present successively to the record ending point on side A. Also recorded at the record starting point of side B is another reverse mark RMK.

FIG. 4 shows an exemplary record format of auxiliary data.

The auxiliary data are recorded by 8 - 10 modulation.

As seen from FIG. 4, bytes 0 to 2 represent the absolute time data in a current frame. The most significant bit S of byte 0 is an identification flag of side A/B for the current frame; S=0 represents side whereas S=1 represents surface B. The upper three bits of bits 4 to 6 in byte 0 denote a BCD (binary-coded decimal) code representative of a hour digit of the absolute time of the current frame. The lower four bits of bits 0 to 3 in byte 0 denote a BCD code representative of a frame number digit(s) of the absolute time of the current frame. Byte 1 denotes a BCD code representative of a minute digit(s) of the absolute time of the current frame. Byte 2 denotes a BCD code representative of a second digit(s) of the absolute time of the current frame.

It should be noted that the time of one frame is 200 msec and hence five frames of 0 to 4 corresponds to one minute.

Bytes 3 to 6 are TOC data 1. Specifically, byte 3 denotes a BCD code (program number data 1) representative of the program number of a program expressed by TOC data 1. Bytes 4 to 6 denote the absolute time of the frame of the program expressed by the program data number data 1. The most significant bit S of byte 4 is an identification flag of side A/B for the current frame; S=0 represents side A, whereas S=1 represents side B. The higher three bits of bits 4 to 6 in byte 4 denote a BCD (binary-coded decimal) code representative of a hour digit of the absolute time of the frame for program 1. The lower four bits of bits 0 to 3 in byte 4 denote a BCD code representative of a frame number digit(s) of the absolute time of the program 1 frame. Byte 5 denotes a BCD code representative of a minute digit(s) of the absolute time of the program 1 frame. Byte 6 denotes a BCD code representative of a second digit(s) of the absolute time of the program 1 frame.

It should be noted that a program denotes one musical piece and a program number denotes the number of the musical piece. It should be also noted that an absolute time denotes a time code representative of the absolute position on a tape, and hence increases monotonously from the starting terminal of a certain side.

Bytes 7 to 10 are TOC data 2. Specifically, byte 7 denotes a BCD code (program number data 2) representative of the program number of a program expressed by TOC data 2. Bytes 8 to 10 denote the absolute time of the head or starting frame of the program expressed by the program data number data 1. The most significant bit S of byte 8 is an identification flag of side A/B for the current frame; S=0 represents side A whereas S=1 represents side B. The higher three bits of bits 4 to 6 in byte 8 denote a BCD (binary-coded decimal) code representative of a hour digit of the absolute time of the program 2 frame. The lower four bits of bits 0 to 3 in byte 8 denote a BCD code representative of a frame number digit(s) of the absolute time of the program 2 frame. Byte 9 denotes a BCD code representative of a minute digit(s) of the absolute time of the program 2 frame. Byte 10 denotes a BCD code representative of a second digit(s) of the absolute time of the program 2 frame.

It should be noted that TOC data 1 and TOC data 2 are different TOC data. In order to improve the transfer rat of the TOC data, two kinds of TOC data are recorded in one frame.

The most significant bit of byte 11 represents a reverse marker.

Figure 5:
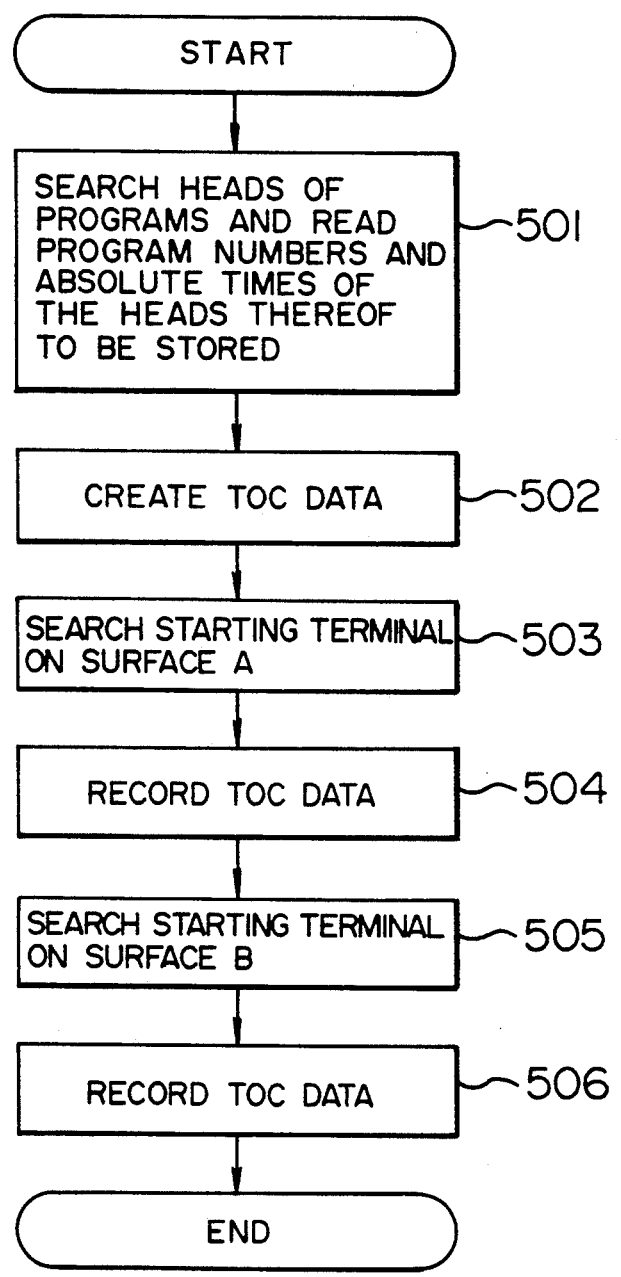
FIG. 5 is a flowchart of the operation in the system control unit 105 in recording TOC in the embodiment of FIG. 1.

FIG. 5 shows in flowchart the operation of the system control unit 105 (FIG. 1) in recording TOC. As seen from FIG. 5, in step 501, an instruction of search mode is issued to the mechanism control unit 102 and the recording/reproducing unit 104 to search the head of each of all programs so that the program number and the absolute time of the head (starting frame) of the program denoted by that program number are read and stored in the memory in the system control unit 105. In step 502, using the stored program numbers and the absolute times at the heads of the corresponding programs, TOC data are made.

In step 503, the starting point of side A is searched. Then, the system control unit 105 directs the mechanism control unit to rewind a reel and decides if the tape has reached its terminal on the basis of a tape terminal flag sent out from the mechanism control unit 102. The mechanism control unit 102 detects the tape terminal in such a manner that an FG (frequency generator) monitors the rotation state of the reel to send out the tape terminal flag when the reel stops.

In step 504, the system control unit 105 gives an instruction of recording mode to the mechanism control unit 102 and also sends the TOC data to the recording/reproducing unit 104 to record TOC. In step 505, the starting terminal or record starting point of surface B is searched. Then, if the system control unit 105 detects either condition of the tape terminal flag supplied from the mechanism control unit 102 or the reverse marker of the reproduced auxiliary data supplied from the recording/reproducing unit 104, it directs the mechanism control unit 102 to stop the running of the tape. In step 506, the system control unit 105 gives a recording mode instruction to the mechanism control unit 102 and also sends the TOC data to the recording/reproducing unit 104 to record TOC.

Figure 6:
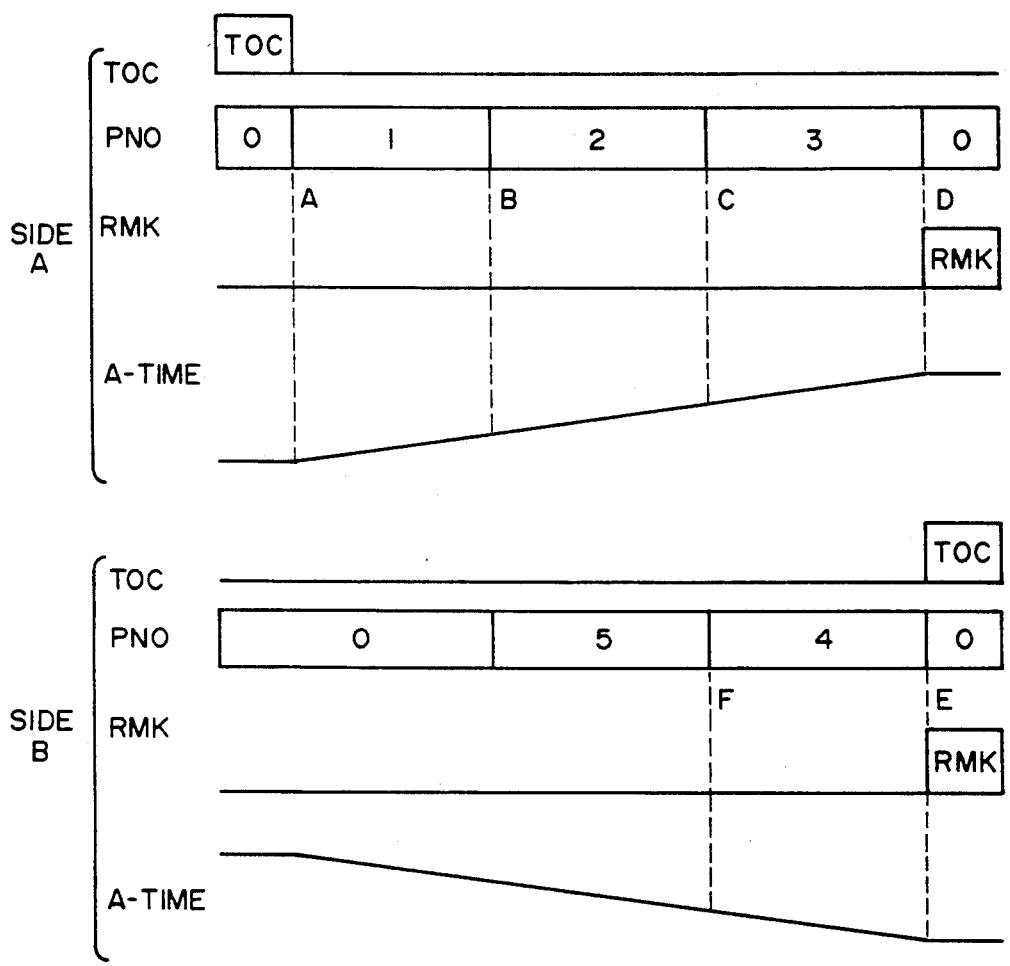
FIG. 6 is a schematic view of the recording state of the auxiliary data on the tape after the TOC recording processing has been made in the embodiment of FIG. 1.

FIG. 6 shows the recording state of the auxiliary data on the tape after the above TOC recording processing has been executed. As seen from FIG. 6, the TOCs having the same contents are recorded at the starting terminal of side A and that of side B, respectively.

An explanation will be given of the operation of the system control unit 105 where the recording/reproducing device according to this embodiment carries out program searching using TOC.

Figure 7:
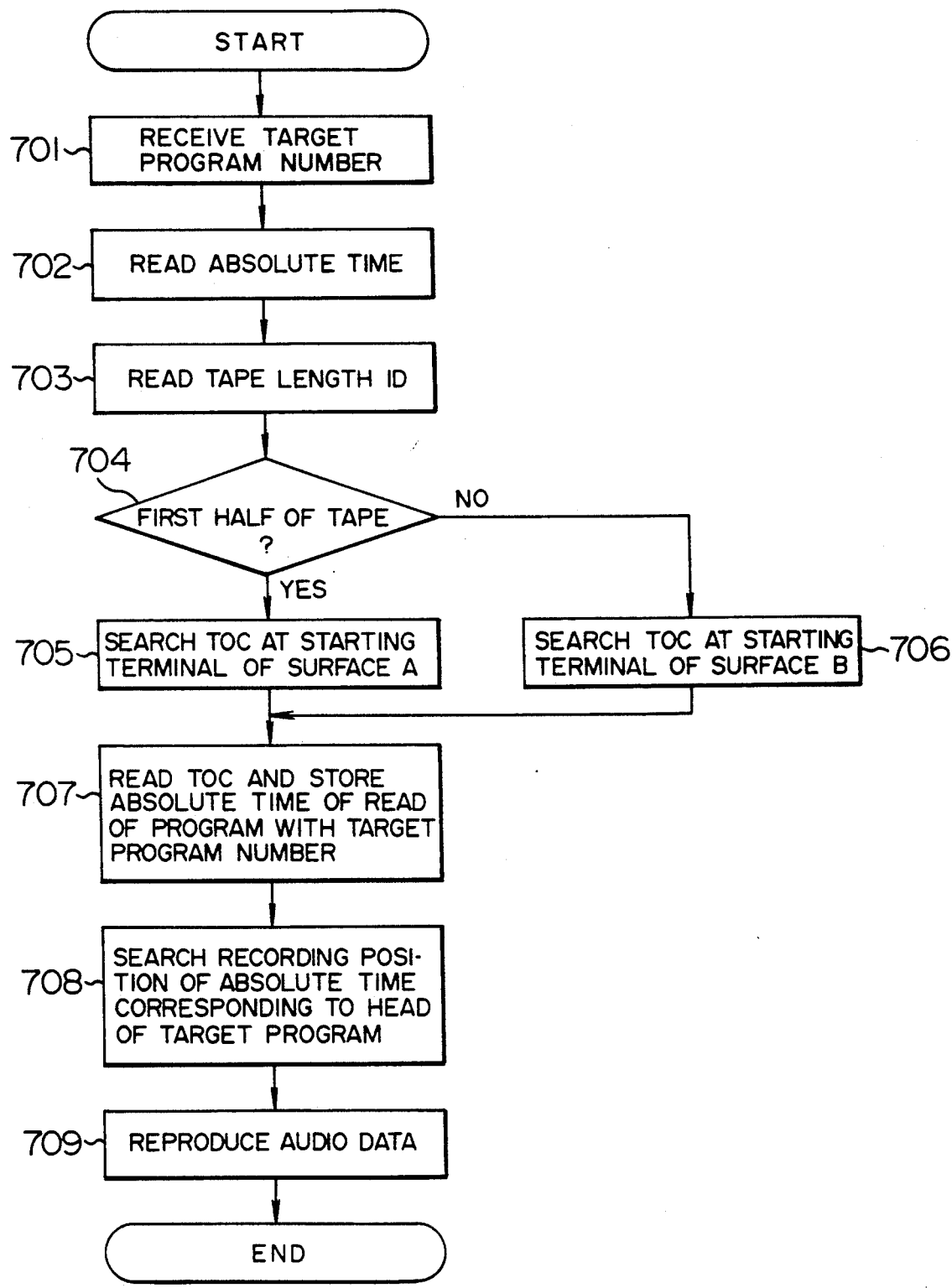
FIG. 7 is a flowchart of the operation in the system control unit 105 in reproducing TOC to do program searching in the embodiment of FIG. 1.

FIG. 7 shows in flowchart the operation of the system control unit 105 when TOC is reproduced to search a program.

Now it is assumed that the tape has a record as shown in FIG. 6.

In step 701, the system control unit 105 receives a target program number from the recording/reproducing mode setting unit 106.

In step 702, the system control unit 105 gives an instruction of reproducing mode to the mechanism control unit 102 and the recording/reproducing unit 104 to accept the absolute time TC in the auxiliary data from the recording/reproducing unit. Through this step, the system control unit 105 can know the position of the tape now being reproduced.

In step 703, it reads the tape length ID sent from the mechanism control unit 102 to know a tape length TL.

In step 704, where the absolute time of side A is read, if it is smaller than ½ of the tape length TL, the processing branches into step 705 whereas if it is larger than ½ of the tape length TL, the processing branches into step 706. Where the absolute time of side B is read, if it is larger than 3/2 of the tape length, the processing branches into step 705 whereas if it is smaller than 3/2 of the tape length, the processing branches into step 706. In short, in step 704, it is decided whether the current position is closer to the starting position of side A or that of side B.

In step 705, the system control unit 105 directs the mechanism control unit 102 and the recording/reproducing unit 104 to search TOC at the starting terminal of side A. Then, the system control unit 105, if it detects the tape terminal information supplied from the mechanism control unit 102, directs the mechanism control unit 102 to stop the running of the tape.

In step 706, the system control unit 105 directs the mechanism control unit 102 and the recording/reproducing unit 104 to search TOC at the starting terminal of surface B. Then, if the system control unit 105 either condition of the tape terminal information supplied from the mechanism control unit 102 or the reverse marker of the reproduced auxiliary data supplied from the recording/reproducing unit 104, it directs the mechanism control unit 102 to stop the running of the tape.

In step 707, the system control unit 105 gives a reproducing mode instruction to the mechanism control unit 102 and the recording/reproducing unit 104, and receives the TOC data from the recording/reproducing unit 104 to extract the absolute time of the head of a target program. In step 708, the system control unit 105 gives a search mode instruction to the mechanism control unit 102 and the recording/reproducing unit 104. In step 709, after the head of the target program is searched in step 708, audio data is reproduced.

An explanation will be given of the operation of the system control unit 105 where the recording/reproducing device according to this embodiment updates TOC.

Figure 8:
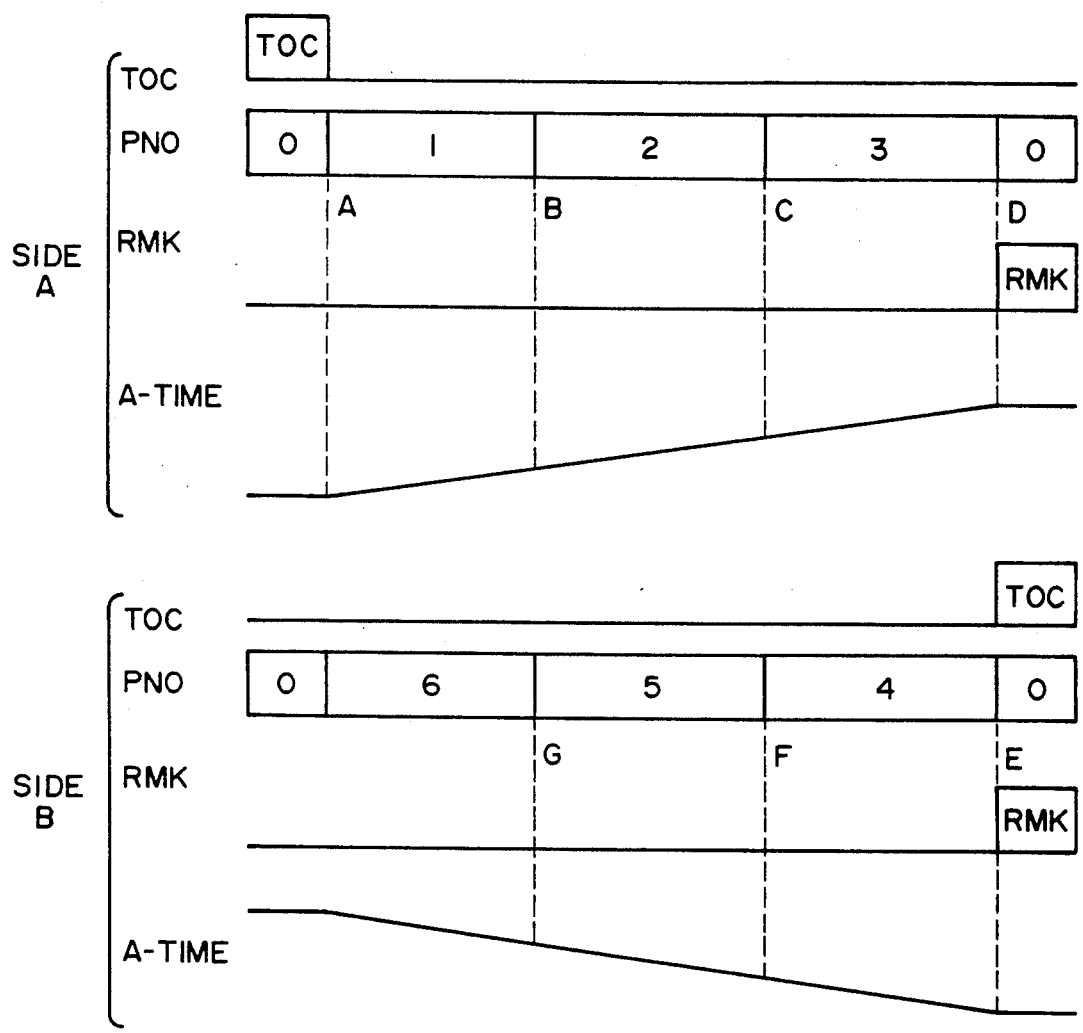
FIG. 8 is a schematic view of a record on the tape when a sixth program is added to the record shown in FIG. 1.

FIG. 8 is a record of the tape when the sixth program (program 6) is added to the record shown in Fig. 6. In this case, the programs on the tape differ from those registered on TOC, which requires updating of TOC.

Figure 9:
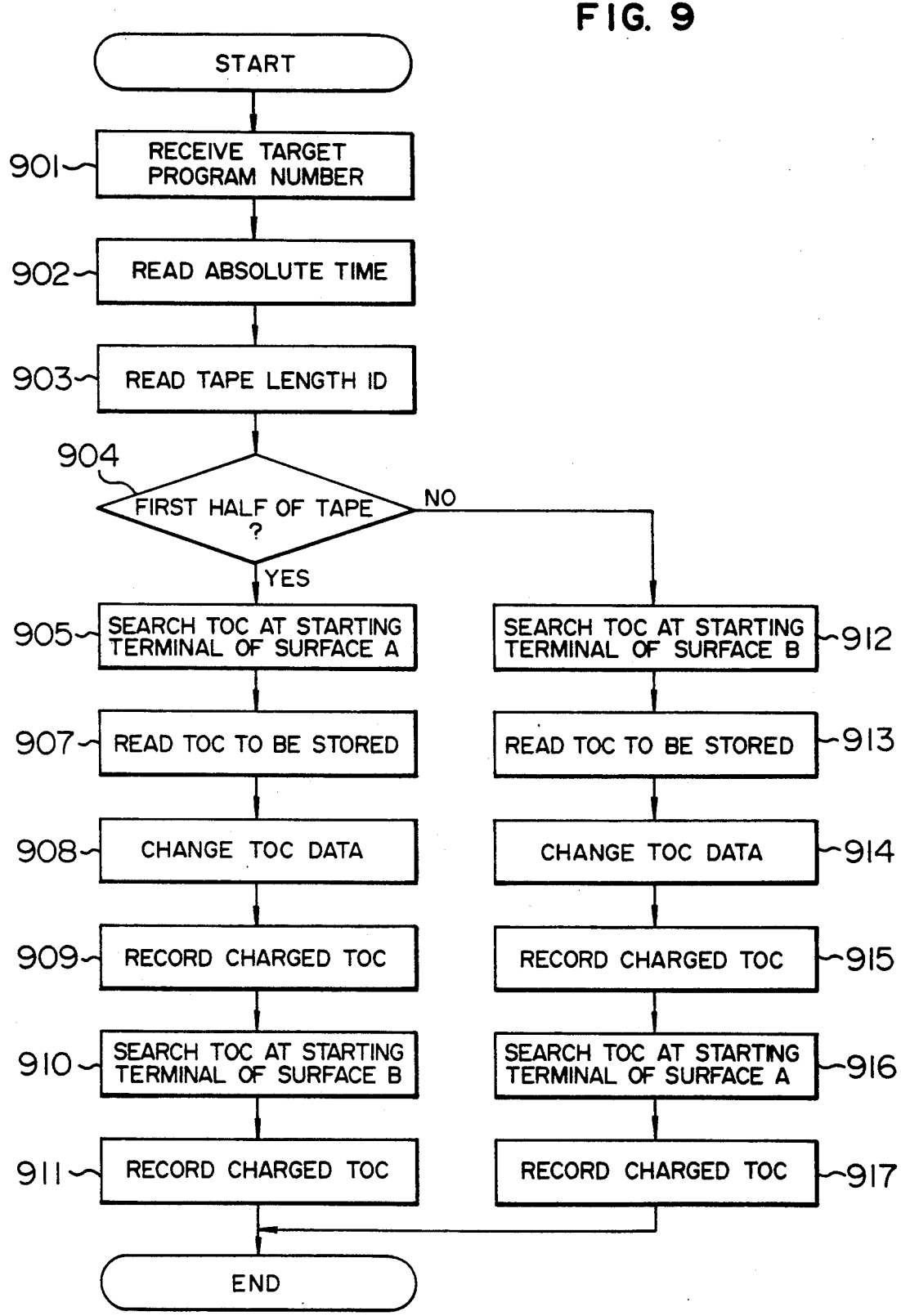
FIG. 9 is a flowchart view of the operation in the system control unit 105 in updating TOC to do program searching in the embodiment of FIG. 8.
Figure 10:
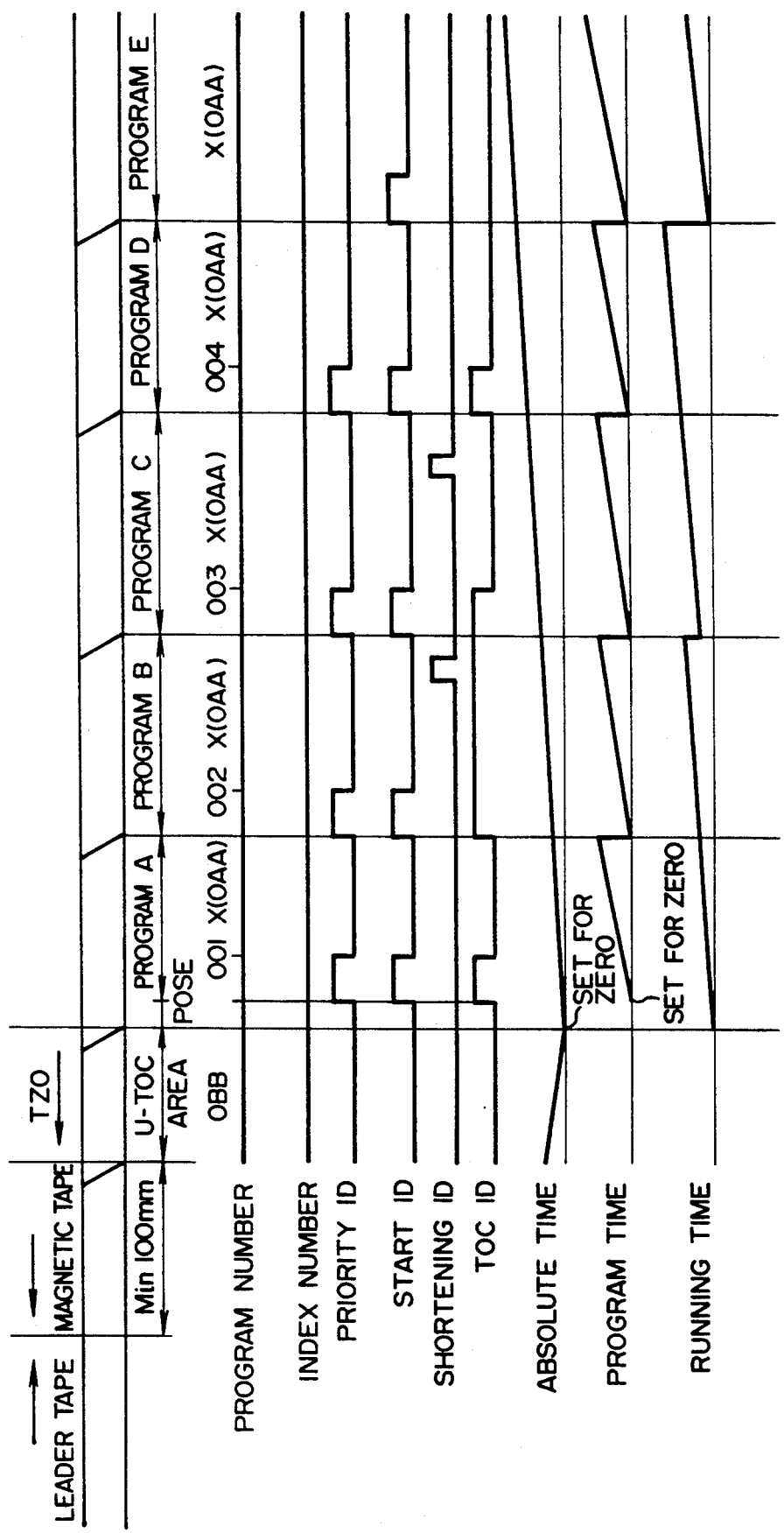
FIG. 10 is a view for explaining a record on a tape for realizing the conventional searching method.

FIG. 9 shows the flowchart of the operation of the system control unit 105 when TOC is updated.

In step 901, the system control unit 105 receives a target program number from the recording/reproducing mode setting unit 106.

In step 902, the system control unit 105 gives reproducing mode instruction to the mechanism control unit 102 and the recording/reproducing unit 104 to read the absolute time TC in the auxiliary data from the recording/reproducing unit 104. Through this step, the system control unit 105 can know the position of the tape now being reproduced.

In step 903, it reads the tape length ID sent from the mechanism control unit 102 to know a tape length TL.

In step 904, where the absolute time of side A is read, if it is smaller than ½ of the tape length TL, the processing branches into step 905, whereas if it is larger than ½ of the tape length TL, the processing branches into step 912. Where the absolute time of side B is read, if it is larger than 3/2 of the tape length, the processing branches into step 905 whereas, if it is smaller than 3/2 of the tape length, the processing branches into step 912. In short, in step 904, it is decided whether the current position is closer to the starting position of side A or that of side B.

In step 905, the system control unit 105 directs the mechanism control unit 102 and the recording/reproducing unit 104 to search TOC at the starting terminal of side A. Then, the system control unit 105, if it detects the tape terminal information supplied from the mechanism control unit 102, directs the mechanism control unit 102 to stop the running of the tape. In step 912, the system control unit 105 directs the mechanism control unit 102 and the recording/reproducing unit 104 to search TOC at the starting terminal of side B. Then, if the system control unit 105 detects either condition of the tape terminal information supplied from the mechanism control unit 102 or the reverse marker of the reproduced supplemental data supplied from the recording/reproducing unit 104, it directs the mechanism control unit 102 to stop the running of the tape. In step 907, the system control unit 105 gives a reproducing mode instruction to the mechanism control unit 102 and the recording/reproducing unit 104, and receives the TOC data from the recording/reproducing unit 104 to be stored in the memory in the system control unit 105. In step 908, the system control unit 105 changes the TOC data corresponding to the added or canceled program. For example, where the record shown in FIG. 6 has been changed to that shown in FIG. 8, the data of the program 6 is read to be added to TOC. In step 909, the system control unit 105 gives recording mode instruction to the mechanism control unit 102 and the recording/reproducing unit 104 to record TOC on side A. In step 910, the system control unit 105 directs the mechanism control unit 102 and the recording/reproducing unit to search TOC at the starting terminal of side B. In step 911, the system control unit 105 gives a recording mode instruction to the mechanism control unit 102 and the recording/reproducing unit 104 to record on side B the same TOC as recorded on side A.

As described above, in step 912, the system control unit 105 directs the mechanism control unit 102 and the recording/reproducing unit 104 to search TOC at the starting terminal of side B. In step 913, the system control unit 105 gives a reproducing mode instruction to the mechanism control unit 102 and the recording/reproducing unit 104, and receives the TOC data from the recording/reproducing unit 104 to be stored in the memory in the system control unit 105. In step 914, the system control unit 105 changes the TOC data corresponding to the added or canceled program. For example, where the record of FIG. 6 has been changed into that of FIG. 8, the data of the program is added to the read TOC. In step 915, the system control unit 105 gives a recording mode instruction to the mechanism control unit 102 and the recording/reproducing unit 104 to record the changed TOC on side B. In step 916, the system control unit 105 directs the mechanism control unit 102 and the recording/reproducing unit 104 to search TOC at the starting terminal on side A. In step 917, the system control unit 105 gives a recording mode instruction to the mechanism control unit 102 and the recording/reproducing unit 104 to record on side A the same TOC as recorded on side B.

In accordance with this embodiment, since the same TOCs are recorded at the record starting terminals on side A of the tape and side B thereof, respectively, in program searching using TOC, the time taken for TOC searching can be shortened by reading the closer TOC between both TOCS. Also in adding or canceling a program, the time taken for TOC rewriting can be shortened by rewriting the closer TOC first.

As understood from the above explanation, the TOC recording/reproducing device according to the present invention can shorten the time taken for TOC searching in program number searching by detecting a current position on a tape to search the closer TOC between the same TOCs recorded at the starting terminal on surface A of a tape and the starting terminal or record starting point on surface B thereof. Also in updating the TOC data, the above device can shorten the time taken for TOC searching in rewrite by rewriting the closer TOC first.

I claim:

1. A TOC recording/reproducing device for recording and reproducing a TOC on and from a tape having a first recording area and a second recording area, said device comprising:

TOC searching means for searching recording areas of the tape;

TOC recording means for recording a first TOC on a record starting end of said first recording area of said tape and a second TOC on a record starting end of said second recording area of said tape, said first TOC and second TOC being identical;

TOC reproducing means for reproducing a TOC from the tape;

TOC creating means for creating new TOC data on the basis of said TOC reproduced by said TOC reproducing means;

tape position detecting means for detecting a position on said tape and outputting tape position information; and tape length detecting means for detecting a length of the tape and outputting tape length information, wherein:

said TOC searching means searches, on the basis of said tape position information and said tape length information, a selected one of said first TOC and said second TOC at one of said first recording area and the second recording area, said TOC reproducing means reproduces said searched TOC, said TOC creating means creates new TOC data on the basis of said reproduced searched TOC, said TOC recording means records a third TOC over said selected one of said first TOC and said second TOC on the basis of said new TOC data, said TOC searching means searches a different one of said first TOC and said second TOC at the other one of said first recording area and said second recording area, and said TOC recording means records a fourth TOC, identical to said third TOC, over said different searched TOC.

2. A TOC recording/reproducing device according to claim 1, wherein said tape length detecting means comprises identification code reading means for reading an identification code, indicating said length, recorded on a cassette containing said tape.

3. A TOC recording/reproducing device according to claim 1, wherein said TOC searching means comprises terminal 4. A TOC recording/reproducing device according to claim 1, wherein said TOC searching means comprises means for determining whether a current position of said tape is closer to said record starting end of said first recording area or said record starting end of said second recording area, and said TOC searching means searches said selected one of said first TOC and said second TOC based on said determination.

5. A TOC reproducing device for reproducing a TOC from a tape having a first recording area and a second recording area, identical TOC information being recorded at both a record starting end of said first recording area and a record starting end of said second recording area, said device comprising:

tape position detecting means for detecting a position on said tape and outputting tape position information;

tape length detecting means for detecting a length of said tape and outputting tape length information;

TOC searching means for selectively searching a TOC, on the basis of said tape position information and said tape length information, at one of the record starting end of said first recording area and the record starting end of said second recording area; and TOC reproducing means for reproducing said searched TOC.

6. A TOC reproducing device according to claim 5, wherein said tape length detecting means comprises identification code reading means for reading an identification code, indicating said length, recorded on a cassette containing said tape.

7. A TOC reproducing device according to claim 5, wherein said TOC searching means comprises terminal detecting means for detecting a starting terminal and an ending terminal of the tape.

8. A TOC reproducing device according to claim 5, wherein said TOC searching means comprises means for determining whether a current position of said tape is closer to said starting end of said first recording area or said record starting end of said second recording area, and said TOC searching means searches said TOC based on said determination.

* * * * *